June 2, 1964     R. C. NORDBERG ETAL     3,135,297

END GRAIN LAMINATES OF FIBER REINFORCED RESINOUS MATERIALS

Filed March 20, 1959     2 Sheets-Sheet 1

LEON PARKER
ROBERT C. NORDBERG
      INVENTORS

BY Philip Sasher
   Mark Gelden

ATTORNEYS

LEON PARKER
ROBERT C. NORDBERG
INVENTORS

BY

ATTORNEYS

United States Patent Office 3,135,297
Patented June 2, 1964

3,135,297
END GRAIN LAMINATES OF FIBER REINFORCED RESINOUS MATERIALS
Robert C. Nordberg, La Mirada, and Leon Parker, Burbank, Calif., assignors to H. I. Thompson Fiber Glass Co., Los Angeles, Calif., a corporation of California
Filed Mar. 20, 1959, Ser. No. 800,823
6 Claims. (Cl. 138—144)

This invention relates to reinforced resinous or plastic materials, and is particularly concerned with plastic materials reinforced with fibrous materials, e.g., glass fibers or vitreous silica fibers or fabrics, to produce a product having unusual resistance to high temperatures.

In many high temperature applications, and particularly for use in jet aircraft, materials presently used are subjected to temperatures so high (3000° F. and over) that practically all of such materials have useful lives on the order only of minutes or seconds. In many such applications the problem is not what materials will withstand these temperatures continuously, but what material will last the longest. In most burn-through applications both temperatures and gas velocity are extremely high. Material failures result from both thermal melting and mechanical erosion. Surprisingly, high temperature metals are usually very poor materials of construction for these uses, and when weight is a consideration, relatively heavy materials of construction, e.g., metals such as steel, are at a decided disadvantage.

Further, while some materials presently known have relatively long burn-through time (time required to burn completely through a given thickness of material) at high temperatures, they generally have serious disadvantages, such as brittleness, or relatively high conductivity making their cold side temperature undesirably high.

Resinous materials having a fibrous reinforcement, e.g., glass fibers bonded with a resin, are known, and these materials have been formed into laminates. However, where conventional fibrous bonded resins or laminates of this nature are exposed to high temperatures and to a high velocity gas blast, very rapid mechanical degradation on the surface of the material occurs, causing a separation of the laminations from each other, as well as fusion and decomposition of the laminate. This is to a large degree due to the fact that the fibrous reinforcement on the hot surface of the laminate is not mechanically tied down to the cooler interior parts of the material or laminate.

It is an object of this invention to design a material having unusually high resistance to high temperatures and to ablation or erosion by hot gases at high impinging gas velocities, and which has good thermal shock characteristics and low heat conductivity.

Another object of the invention is to afford a reinforced plastic or resinous material having a much slower rate of consumption under the aforementioned conditions than presently employed materials, or for a given thickness of material has a longer burn-through time, or for a given burn-through time requires a smaller thickness than prior art materials.

A still further object is the provision of a fiber reinforced resinous material or laminate which can be readily laid up or molded into a variety of shapes and which is readily fabricated by procedure involving a minimum of waste material.

Still another object is to provide a fiber-reinforced plastic material having the aforementioned properties, and particularly adapted to high temperature ablation type applications.

A particular object is the formation of circular, elliptical and other shapes from laminates of reinforced resinous sheets of material having the aforementioned properties.

A still further object is the provision of procedure for readily fabricating the above noted structures.

Other objects and advantages will be apparent from the following description of the invention.

The above noted objects and advantages are achieved, according to the invention, by providing a resin bonded fibrous material having a structure wherein the fibers are oriented so that one of the ends of the fibers extends into one surface of the sheet and the opposite ends of the fibers extend into the opposite surface of the sheet, and wherein a substantial portion of the reinforcing, e.g., glass or silica fibers, are positioned generally so that they extend in a relatively long path from one surface to the opposite surface of the resinous sheet. For this purpose, according to the invention structure, the fibers are positioned at an angle to their terminating surfaces. Since substantially all of the ends of the fibers in the invention structure terminate in the opposite major surfaces of the sheet an "end grain" structure is thus possessed by these surfaces, and the above quoted expression is employed herein to denote such structure. A plurality of layers or sheets of resin bonded fibrous material of the nature aforementioned are bonded together in layers to form a laminate.

A significant feature of this end grain form of structure is that when the fibers of the end grain structure are positioned at an angle less than 90° with the surfaces which they intersect according to the invention, the structure is much more resistant to disintegration or separation of the respective layers of material when a plurality of the above noted end grain sheets are formed into a laminate.

The invention structure can be formed conveniently by bonding the reinforcing fibers with resin in the usual manner so that the warp and fill fibers of the sheet extend in their usual substantially perpendicular direction in the sheet. The sheet can then be cut on a bias in such a way that the warp or lengthwise extending fibers now extend into opposite side surfaces of the sheet at an angle, e.g., of 45° or less, with these surfaces such that there is a relatively long path defined by the warp threads from one side surface to the opposite side surface of the sheets.

In forming a laminate, a plurality of sheets of resin bonded fiber of conventional form, that is, with the warp and fill fibers running in the usual directions, can be laid up on a bias and individual strips cut from the sheet material. Usually a 45° bias is used, but other angles of bias can be employed. This forms end grain strips in which substantially all of the fibers extend from one longitudinal surface to the other. A number of such end grain sheets can then be laminated and the stacked material slit into strips corresponding to the thickness of the part to be made.

Alternatively, the sheets of resin bonded fibers can be stacked and laid up on a bias, and the stacked material then cut on a bias to form the end grain structure.

According to one procedural embodiment, strips of resin bonded fibers, preferably silica fibers, are stacked, the stacked strips of materials are cold pressed, the laminate thus formed is slit or cut on a bias to form strips of laminate, and the slit material laid up in a mold and pressed tightly into place to form the final laminated shape.

The end grain sheet or laminate so formed has substantially higher resistance to high temperatures and to ablation by high velocity high temperature gas jets than ordinary resin bonded fiber materials, e.g., the normal grain laminates. The advantage of such end grain structure is lower heat conductivity from the hot to the opposite cold surface since the heat must be conducted along the fibers, e.g., silica or glass fibers, from the hot to the cold surface, and the fibers are not mechanically removed by the gas stream and are thus melted before burn-through takes place.

The end grain invention structure is of particular value for fabricating circular or similar, e.g., oval shapes, cylindrical and conical sections, which are to be subjected to vigorous contact with high velocity gas jets at extremely high temperatures, where ablation generally occurs. In these circular parts, the fibers extend from the inner hot surface to the outer cool surface at an angle to the radius so that tangents to the ends of the fibers are not perpendicular to the radius. Thus, as aforementioned, burning takes place through the resin and melting or destruction of the fibers from the hot inner surface to the cool outer surface takes longer than in conventional structures.

The fibers employed in the resin bonded structure of the invention can be any fibers which have high resistance to burning, physical destruction and melting. Organic and inorganic fibers such as, for example, nylon and asbestos fibers can be employed. We have found that the use of glass fibers and particularly vitreous silica fibers give outstanding results and are preferred. The use of glass fibers, particularly vitreous silica fibers, affords outstanding advantages, including a remarkable resistance to high temperatures, excellent thermal shock properties, resistance to thermal melting and to erosion at high impinging gas velocities, low thermal conductivity, and high strength.

The silica fibers used in the invention composition are those which may be produced, for example, according to U.S. Patent 2,491,761. These silica fibers are produced generally by leaching glass fibers in neutral or preferably acid solution until substantially all of the glass forming oxides other than silica are withdrawn. The fibers are then dried, and if desired, also fired, that is, heated to high temperature. The resulting fibers, which are usually at least partially dehydrated, are composed of silica preferably having at least 90% $SiO_2$, and usually over 96% $SiO_2$ and up to or above 99% $SiO_2$. The silica fibers are essentially in non-crystalline amorphous form, although a minor portion of crystalline material may also be present. The term "vitreous" used in relation to the silica employed in the invention is intended to denote said essentially amorphous form of silica as contrasted to the essentially crystalline forms of silica. The essentially amorphous types of silica fibers are available in various forms including bulk fiber and cloth. In producing the silica fiber-reinforced plastic materials of the invention, said silica fibers are preferably employed in the form of cloth. The above noted leached silica fibers do not melt or vaporize until temperatures exceed 3000° F.

In a typical process for producing the aforementioned leached silica fibers of high $SiO_2$ content, glass fiber material preferably woven in cloth form is immersed in 13% by weight HCl solution and leached therein for an extended period, e.g., about 8 hours. The leached cloth is then rinsed with water and drained until the material is substantially free of chlorides. The cloth is then dried at a temperature of about 160° F. for about 10 minutes and is then transferred to a heat treating furnace where the cloth is fired for about 5 minutes at about 1800° F. to produce a leached silica fiber cloth having about 5% or less combined water.

Where the cloth is not fired after drying, the resulting silica fibers may have as much as 23% combined water. Where the silica fibers are fired, e.g., from about 1000 to about 2000° F., silica fibers having substantially less combined water are produced, e.g., 3 or 4% water when fired at about 2000° F.

The silica fibers employed in the invention composition confer advantageous properties on the thermosetting resin binder not only because of the high melting point of such fibers, but because of its resistance to erosion as well. Above 3000° F. the viscosity of the silica of which the fibers are composed is high enough to prevent it from being easily blown away. Most other refractory materials would become quite fluid at these same temperatures. Also, an appreciable amount of the silica vaporizes when it finally is removed. This vaporization tends to cool the surface of the silica fiber-resinous material and contributes to a slower burning rate for said material.

However, other types of fibers can also be employed, as indicated above.

The resins employed in the composition can be any resin which will bond the silica fibers and form a laminate preferably having the high temperature resisting properties aforementioned. These resins include both thermosetting and thermoplastic resins, preferably high temperature thermosetting resins. Examples of such resins are the phenolics such as phenol-formaldehyde and phenol-furfural, urea-aldehyde resins such as urea formaldehyde, silicones such as methyl silicone resins formed by hydrolyzing dimethyl-dichlorosilane to form dimethyl silicone, and then oxidizing the latter with air and a catalyst, melamine resins, epoxys (condensation products of bisphenol and epichlorohydrin), polyester resins, e.g., unsaturated alkyd resins in combination with a low viscosity monomer such as styrene or diallyl phthalate, vinyls such as polyvinyl chloride and acetate, and copolymers thereof. Preferred compositions according to the invention are made using phenolics such as phenol-formaldehyde, which may also contain varying amounts of other blending material such as pigments, fillers and the like.

In producing the fibrous reinforced plastic materials employed in the invention the reinforcing fibers, e.g., silica fibers preferably in the form of a mat, non-woven tape, cloth, and the like, wherein the fibers are oriented, are dipped or immersed into a tank of the resinous material in liquid form, with which the fibrous material is to be bonded. Where, as in preferred practice, the resin employed is a thermosetting resin such as phenol-formaldehyde, the fibrous material thus coated or impregnated with the resin is treated at elevated temperature for a relatively short period to partially solidify or polymerize the resin to an intermediate or so-called B stage. A plurality of strips or layers of the resulting resin bonded silica fiber materials can then be placed one on top of the other in a mold and the assembly of layers cold pressed. The laminated block is then cut on a bias into strips, as previously described, to produce the end grain laminates of the invention. The resulting laminated strips are flexible and can be twisted or bent to form any desirable shape. The shapes so formed can be placed in a mold and heated under pressure to cure the resin and form a shaped laminate composed of a substantial number of layers of reinforcing, e.g., silica, fibers bonded together by intermediate layers of resin. Thus, for example, each layer of resin bonded silica fiber cloth can be on the order of about .01 inch thick, with some 40 to 50 of such layers bonded together to form a ½ inch thick block of such laminated layers.

Preferably, the silica fibers are impregnated with about 20 to about 50% of resin. It has also been found that in order to obtain a composition having the high resistance to burning or the relatively long burn-through properties according to the invention, the laminate should be formed so that it has a density preferably of at least 60 pounds per cubic foot, and most desirably in the range from about 80 to about 120 pounds per cubic foot.

The invention will be more clearly understood by reference to the description of certain embodiments, taken in connection with the accompanying drawings wherein.

Figure 1:
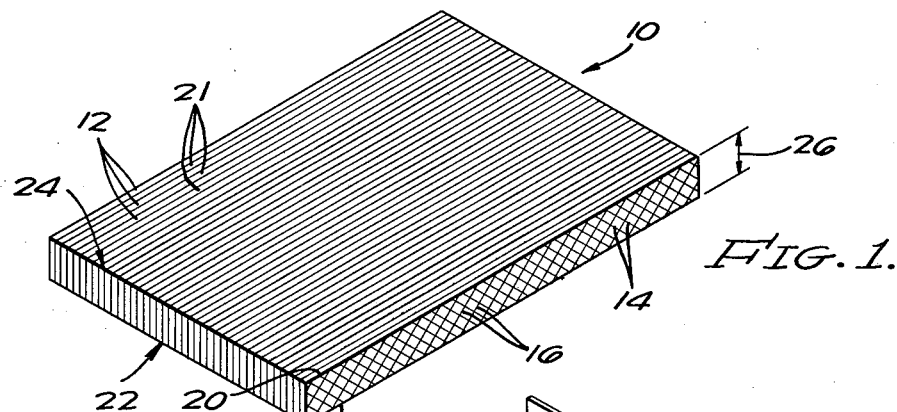
FIG. 1 is a perspective view of a strip of end grain laminate formed from a number of resin bonded fibrous sheets.

Referring to FIG. 1, the end grain laminate 10 is composed of a number of strips 12 of reinforcing fibers, e.g., in the form of vitreous silica fiber cloth, bonded by a resin such as phenol-formaldehyde. Each of the strips 12 has been cut on a bias, e.g., a 45° bias, so that the warp and fill threads 14 and 16 are positioned at an acute angle to the outer surfaces 18 and 20 of the laminate. Each of the resin bonded end grain strips is adhered to a like strip by an intermediate layer of resin 21. It is seen that all of the fibers 14 and 16 terminate at one end thereof in one surface 18 of the laminate and terminate at their opposite ends in the opposite surface 20 of the laminate. Thus, the path of heat conduction from the hot side, e.g. the underside 22, of the laminate 10, to the opposite cold upper side 24 of the laminate, is along the inclined paths of the fibers 14 and 16 from the hot to the cold side of the laminate 10. It is readily seen that due to the elongated path of heat conduction provided by the cutting of strips 12 on a bias so that the ends of the fibers thereof terminate in opposite surfaces of the laminate and define an elongated path from the hot to the cold surface, the resulting laminate has a lower heat conductivity and improved physical properties from the standpoint of resistance to separation of the respective layers due to the increased fiber length.

Figure 6:
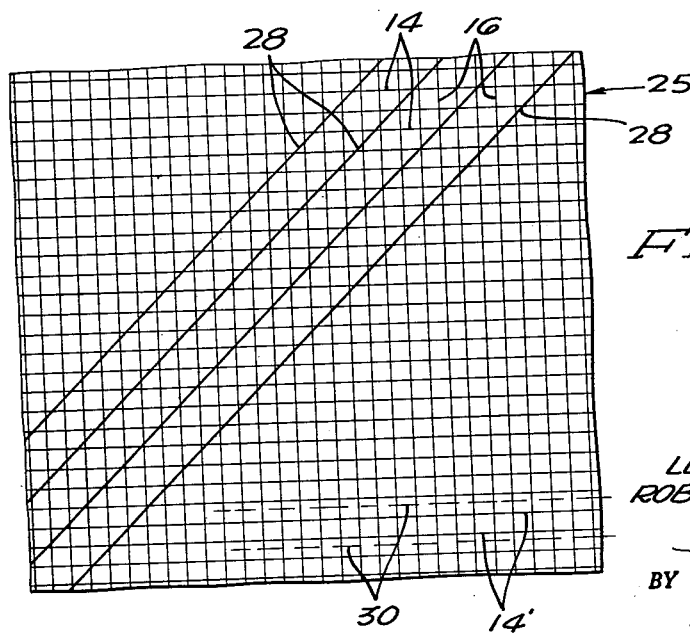
FIG. 6 illustrates cutting of the laminate on a bias to produce the end grain laminated strips shown in FIG. 1.

According to one mode of procedure for producing the laminate of FIG. 1, a cloth formed of vitreous silica fibers is coated with a phenol-formaldehyde resin and the resin partially polymerized to the B stage. A number of sheets 25 (see FIG. 6) thus coated are stacked up one atop the other. The sheets are then cold pressed at pressures below that which would cause rupture, causing the layers of resin bonded silica cloth to be well adhered together. The stacked material is then slit into strips as illustrated in FIG. 6, the width of the strips corresponding to the thickness of the part to be made, e.g. the thickness indicated at 26 in FIG. 1. The stripping or cutting is done on a bias, along lines 28, as illustrated in FIG. 6, e.g. a 45° bias, so that the warp threads 14 and the fill threads 16 are at a 45° angle to the cut edges 28 of the strips. This cutting on a bias illustrates how all the threads 14 and 16 are made to terminate in the opposite cut surfaces of each of the strips whereas, according to the prior art, if said strips of laminate were formed by cutting lengthwise of sheets 25, say along the dotted lines 30, the warp threads 14' would not all terminate in the opposite cut edges of the strip but would run lengthwise thereof.

Figure 2:
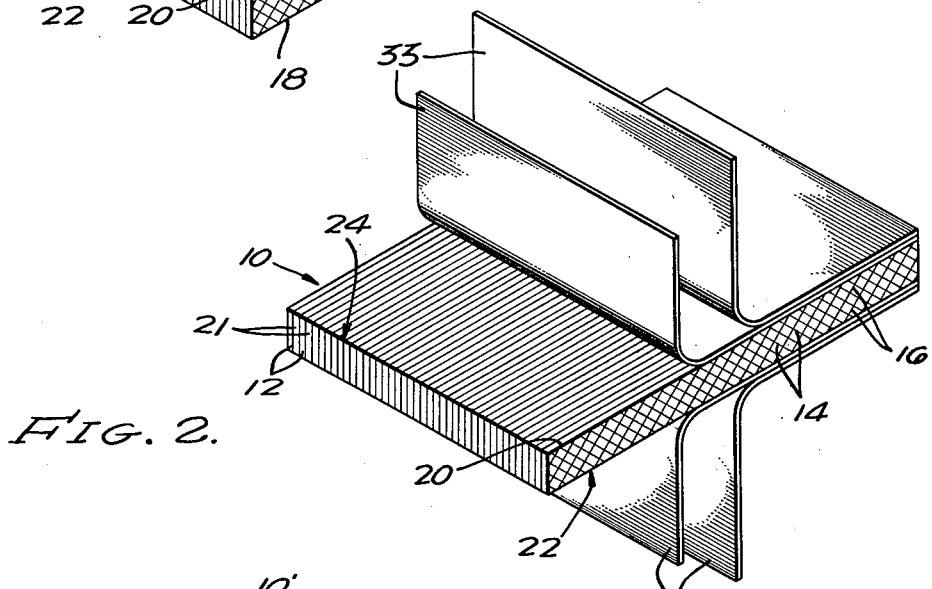
FIG. 2 is a perspective view of a laminate similar to FIG. 1, sandwiched between sheets of outer insulating material.

In FIG. 2 is shown one mode of application of the laminate 10 of FIG. 1 for use as a heat shield. This is accomplished by attaching a pair of contiguous flexible sheets 32 in any suitable manner, to the underside 22 of the laminate, and a like pair of sheets 33 to the upper surface 24 of the laminate. This sandwich structure enhances the physical strength of the laminate.

Figure 3:
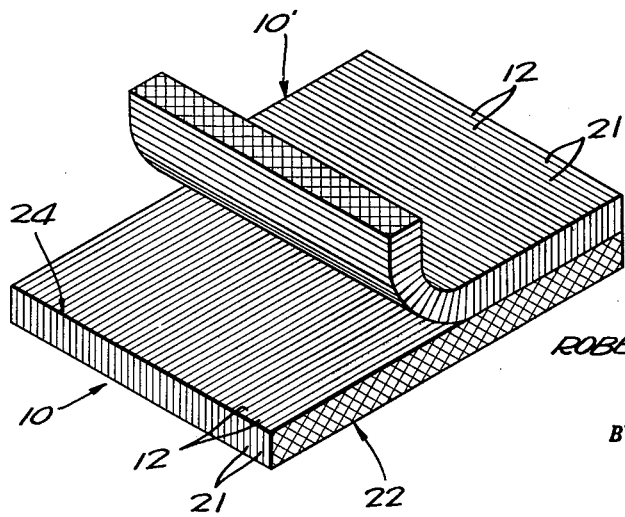
FIG. 3 shows a pair of end grain laminates according to the invention, employed in combination.

In FIG. 3, two identical laminates 10 and 10' formed of end grain strips, according to the invention, are laid one atop the other, with the upper laminate rotated 90° from the position of the lower laminate, so that the strips 12 of the upper laminate are positioned at a 90° angle to the strips 12 of the lower laminate. The two laminates 10 and 10' can be adhered in any suitable manner to form a double laminate having enhanced resistance to high temperatures and ablation.

The end grain laminate 10 can also be employed in other combination structures to increase its effectiveness. Thus, for example, it may be employed in combination with layers of silica fiber batting or in combination with a honeycomb structural material.

Figure 4:
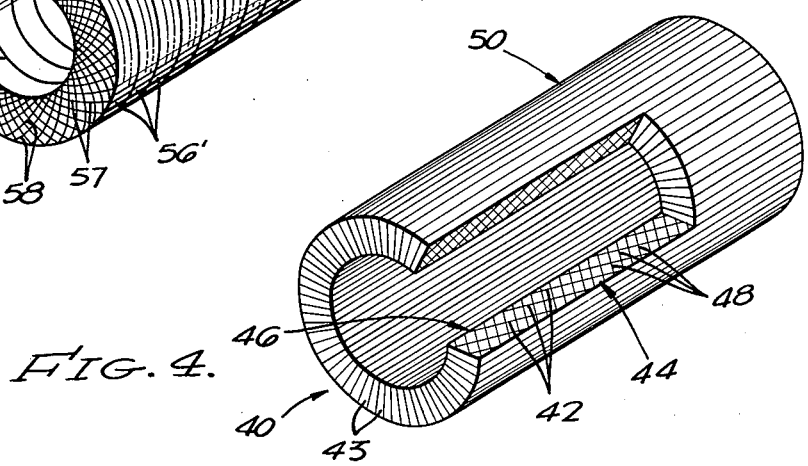
FIG. 4 is a perspective view of the end grain laminate principles of the invention utilized in production of a hollow cylindrical part.

Of particular significance the end grain laminates of the invention can be employed for fabricating structures in the nature of a surface of revolution such as a cylinder, as illustrated in FIG. 4. Here a laminate 40 is formed in a manner similar to the laminate 10 of FIG. 1, except that in laminate 40 strips 43 forming the laminate are cut on a different bias than the strips 12 of laminate 10, so that the warp threads 42 extend at a smaller angle to the opposite surfaces 44 and 46 of the laminate than do the warp threads 14 in laminate 10, and the fill threads 48 are shorter than warp threads 42 and extend almost at right angles to the surfaces 44 and 46 of the laminate.

In forming the cylinder 50, the flat laminate 40 in a form similar to laminate 10 is bent around a cylindrical mandrel with the strips 43 positioned parallel to the axis of the mandrel, and the unit placed in a suitable mold and subjected to heat and pressure in well known manner to cure the resin and form the desired laminate having an end grain structure according to the invention.

It will be seen particularly that the warp threads 42 extend in a relatively long path from say the hot inner surface 46 of the cylinder 50 to the cold outer surface 44. Due to the elongated fibrous path provided by this structure, the heat conductivity is reduced and the tendency toward physical removal of the layers of the laminate is substantially reduced due to the increased shear area afforded by the elongated fibers. Also, a structure of enhanced strength is provided, having greater resistance to ablation by hot gasses passing at high velocity through the interior of cylinder 50. In this embodiment it will be noted that the strips 43 forming the laminate extend parallel to the axis of the cylinder 50.

Figure 5:
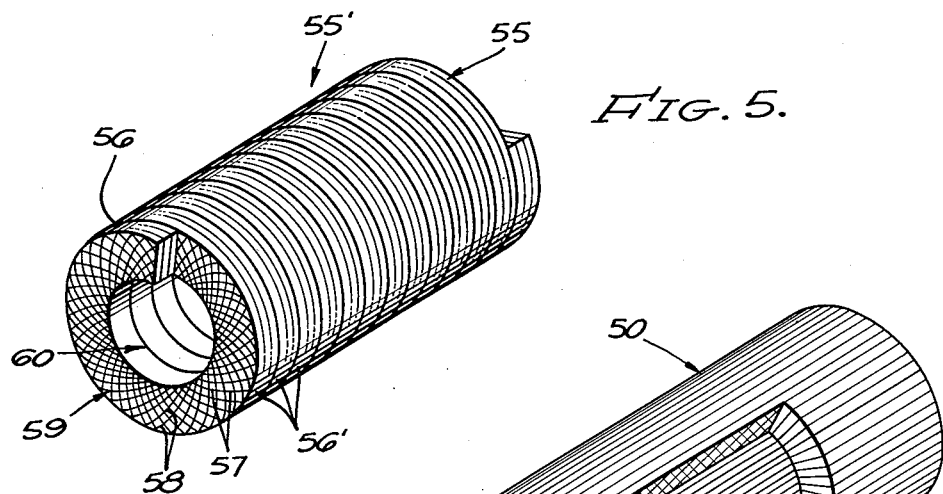
FIG. 5 is a perspective view of a helix formed employing the resin-bonded reinforced fiber laminate of the invention.

Referring to FIG. 5, there is shown another preferred embodiment of the invention for making a hollow cylindrical shape employing a helical form of end grain laminated material to be wound about or placed within a surface which is to be protected, or which can itself be employed as a conduit for passage therethrough of jets of gasses at high temperatures. The helix 55 forming cylinder 55' is produced from an elongated strip 56 formed of individual laminated end grain strips of resin bonded fibers, e.g. phenol-formaldehyde resin bonded glass or vitreous silica fabric, e.g. as described above. The elongated laminated end grain strip 56 is wound about a mandrel in helical fashion with adjacent convolutions 56' in contact with each other, to form the helix 55. The cutting of strip 56 on a bias, as previously described to form the end grain structure wherein the warp and fill threads 57 and 58 each extend from one outer surface 59 of the strip 56 to the opposite surface 60 of said strip, facilitates the flexing and winding of the strip 56 to form the helix. The winding of the strip 56 on the mandrel can take place shortly after the laminated strip 56 has been formed and the resin, where the latter is a thermosetting resin, e.g. of the phenol-formaldehyde type, is only partially polymerized, and after the helix has been formed the resin can be fully cured.

It will be noted particularly that in the instant modification, as result of flexing and winding the strip, the warp and fill fibers 57 and 58 extend in an elongated arcuate path at an angle to the radii extending outwardly from the axis of the cylindrical structure 55' formed by the helix. Thus, where the inner surface 60 of the helix is the hot side and is exposed to extremely high temperatures and high gas velocity, it is seen that melting of the fibers 57 and 58 takes place along an elongated path from the hot inner side of the helix to the cold outer surface 59 of the helix. This structure reduces the heat conductivity of the laminate. Further, the end grain laminated structure materially decreases ablation or deterioration of the laminate by hot gas jets passing through the cylinder.

It will be noted that the convolutions 56′ of the laminated strip 56 forming insulating cylinder 55′ are disposed at an angle of about 90° with respect to the axis of cylinder 55′. It will be understood that the convolutions 56′ can be positioned at angles less than 90° with the axis of cylinder 55′. This will materially increase the interlaminar sheer area between plies to physically strengthen the laminate. On the other hand, strips 43 of the laminate in FIG. 4 form an angle of 0° with the axis of cylinder 50. Hence, it is seen that by means of the invention, the characteristics and properties of the laminated cylindrical or similarly shaped end grain structures can be varied for particular applications.

From the foregoing it is seen that we have provided an end grain resin bonded fiber laminate which can be formed into varoius desired shapes having novel internal structure, and which has superior resistance to extremely high temperatures and high gas velocities. Such materials are particularly adapted for jet engine applications.

While we have described particular embodiments of our invention for purposes of illustration, it should be understood that various modifications and adaptations thereof may be made within the spirit of the invention as set forth in the appended claims.

We claim:

1. An end grain laminate resistant to high temperature and to ablation by impingement of gas jets at high velocity, said laminate being in the form of an essentially hollow solid structure defined by inner and outer surfaces of revolution and having a central axis, with one side surface of said laminate comprising the interior surface of said hollow structure and the opposite side surface of said laminate comprising the outer surface of said hollow structure, said laminate comprising a plurality of strips each composed of woven fibers resistant to high temperatures bonded by a resin having high temperature resistance, said laminate further comprising intermediate layers of said resin bonding adjacent pairs of said strips, the opposite side edges of said strips constituting the opposite side surfaces of said laminate, said strips lying on a bias so that one end of substantially all of the fibers extends into one side surface of said laminate, the other ends of substantially all of the fibers extending into the opposite side surfaces of said laminate, said fibers being positioned to extend in an elongated path from said one side surface to the opposite side surface of said laminate and forming an acute angle with said side surfaces.

2. An end grain laminate as defined in claim 1, wherein said strips and intermediate layers extend substantially parallel to said axis.

3. An end grain laminate as defined in claim 1, wherein said fibers are leached vitreous silica fibers.

4. An end grain laminate as defined in claim 1, wherein said laminate comprising said strips and intermediate layers of resin is in the shape of a helix about said axis, the adjacent convolutions of said helix being substantially in contact with each other.

5. An end grain laminate resistant to high temperature and to ablation by impingement of gas jets at high velocity, said laminate being in the shape of an essentially hollow cylinder, with one side surface of said laminate comprising the interior surface of said cylinder suitable for exposure to high velocity gas jets and the opposite side surface of said laminate comprising the outer surface of said cylinder, said laminate comprising a plurality of woven cloth strips each composed of fibers resistant to high temperatures bonded by a resin having high temperature resistance, said laminate further comprising intermediate layers of said resin bonding adjacent ones of said strips, the opposite side edges of said cloth strips comprising the opposite side surfaces of said laminate, said strips lying on a bias relative to the weave of the cloth so that one end of substantially all of the fibers extends into one side surface of said laminate, the other ends of substantially all of the fibers extending into the opposite side surface of said laminate, said fibers extending in an elongated path from said one side surface to the opposite side surface of said laminate and forming an acute angle with said side surfaces.

6. An end grain laminate resistant to high temperature and to ablation by impingement of gas jets at high velocity, said structure being in the shape of a generally curved helical configuration comprising a laminated strip with adjacent helical convolutions disposed in contiguous relation, one side surface of said laminated strip comprising the interior surface of said helical configuration and the opposite side surface of said laminated strip comprising the outer surface of said helical configuration, said laminated strip comprising vitreous silica layers of woven fibers resistant to high temperatures and bonded by a resin having high temperature resistance, said laminated cloth strip further comprising intermediate layers of said resin bonding adjacent pairs of said fiber layers, the opposite side edges of said strip comprising the opposite side surfaces of said laminate, the fibers of said laminated strip being interwoven and lying on a bias relative to the edge of the strip so that one end of the fibers extends into one side surface of said laminate, the other ends of the fibers extending into the opposite side surface of said laminate, said fibers extending in an elongated arcuate path from said one side surface to the opposite side surface of said laminate, said fibers being positioned at an angle to radii extending outwardly from the axis of said cylindrical structure.

References Cited in the file of this patent

UNITED STATES PATENTS

| | | |
|---|---|---|
| 1,771,216 | Gossler | July 22, 1930 |
| 2,001,970 | Mazer | May 21, 1935 |
| 2,036,467 | Ellis | Apr. 7, 1936 |
| 2,084,313 | Beach | June 22, 1937 |
| 2,174,431 | Wentzell | Sept. 26, 1939 |
| 2,191,807 | Roe | Feb. 27, 1940 |
| 2,322,771 | Palm et al. | June 29, 1943 |
| 2,373,500 | Pearce | Apr. 10, 1945 |
| 2,491,761 | Parker et al. | Dec. 20, 1949 |
| 2,542,593 | Sullivan | Feb. 20, 1951 |
| 2,546,230 | Modigliani | Mar. 27, 1951 |
| 2,561,449 | Ruderman | July 24, 1951 |
| 2,562,951 | Rose et al. | Aug. 7, 1951 |
| 2,594,838 | Alexander et al. | Apr. 29, 1952 |
| 2,749,643 | Scott | June 12, 1956 |
| 2,782,465 | Palmer | Feb. 26, 1957 |
| 2,862,524 | Smith | Dec. 2, 1958 |
| 2,888,042 | St. John et al. | May 26, 1959 |
| 2,949,953 | Di Maio et al. | Aug. 23, 1960 |
| 2,950,152 | Garceau | Aug. 23, 1960 |
| 2,984,262 | Aymami et al. | May 16, 1961 |

UNITED STATES PATENT OFFICE
CERTIFICATE OF CORRECTION

Patent No. 3,135,297                        June 2, 1964

Robert C. Nordberg et al.

It is hereby certified that error appears in the above numbered patent requiring correction and that the said Letters Patent should read as corrected below.

Column 8, lines 28 and 29, for "vitreous silica layers of woven fibers" read -- layers of woven vitreous silica fibers --.

Signed and sealed this 10th day of November 1964.

(SEAL)
Attest:

ERNEST W. SWIDER                     EDWARD J. BRENNER
Attesting Officer                      Commissioner of Patents